United States Patent [19]

Strickler et al.

[11] Patent Number: 4,899,984

[45] Date of Patent: Feb. 13, 1990

[54] OBTURATOR RING FOR BUTTERFLY VALVE

[75] Inventors: Philippe Strickler; Jean-Michel Renaux, both of Toulouse, France

[73] Assignee: ABG Semca, Toulouse, France

[21] Appl. No.: 251,392

[22] Filed: Sep. 30, 1988

[30] Foreign Application Priority Data

Oct. 2, 1987 [FR] France .................. 87 13659

[51] Int. Cl.⁴ .............................................. F16K 1/226
[52] U.S. Cl. ...................................... 251/306; 251/180
[58] Field of Search ..................... 251/180, 306, 307

[56] References Cited

U.S. PATENT DOCUMENTS

| | | |
|---|---|---|
| 1,591,903 | 7/1926 | White . |
| 3,556,475 | 1/1971 | Olenik . |
| 3,586,290 | 6/1971 | Null . |
| 4,632,360 | 12/1986 | De Salve ..................... 251/180 X |

FOREIGN PATENT DOCUMENTS

| | | | |
|---|---|---|---|
| 339107 | 10/1977 | Austria | ............................... 251/306 |
| 2234499 | 11/1977 | France . | |
| 2288259 | 7/1979 | France . | |

*Primary Examiner*—Gerald A. Michalsky
*Attorney, Agent, or Firm*—Oblon, Spivak, McClelland, Maier & Neustadt

[57] ABSTRACT

Disclosed is an obturator ring for valves of the butterfly valve type which has, mounted in a groove made on the periphery of the flap, a split ring-shaped seal working with a first elastic member applying the seal against the valve body and a second elastic member applying the seal against the groove, the elastic members being made of a refractory material.

8 Claims, 2 Drawing Sheets

OBTURATOR RING FOR BUTTERFLY VALVE

BACKGROUND OF THE INVENTION

1. Field of the Invention

The present invention concerns an obturator ring for valves of the butterfly valve type.

2. Description of the Prior Art

Butterfly valves are used, notably in fluid circuits, to stop or not stop the flow of fluid in at least a part of the circuit. For this type of valve to work properly, a high degree of imperviousness must be obtained, in the closed position, between the obturator element or flap and the valve body.

To this effect, a obturator ring is most commonly used. This obturator ring consists of a continuous circular seal. This circular seal is mounted in a groove, made on the edge of the flap. In the closed position, this circular seal comes into contact with a cylindrical bearing surface of the valve body.

A obturator ring of this type has a certain number of drawbacks. In particular, there are residual leaks as the fluid flows partly between the obturator ring and the groove of the flap. Furthermore, the use of a continuous, ring-shaped seal causes problems in assembly. In general, the body of the flap has to be machined to make a part of the groove and an additional end plate is added to the flap to hold the obturator ring in position.

Furthermore, when the butterfly valve has to be used in fluid circulation circuits having to work under a wide range of pressures which may vary between 500 millibars and 24 bars and under temperatures which may vary between ambient temperature and 600° C., it is difficult to make an obturator ring which works properly at all the above-mentioned pressures and temperatures. The compromise torque is modified according to temperatures and pressures.

SUMMARY OF THE INVENTION

An object of the present invention, therefore, is to make a obturator ring for valves of the butterfly valve type, providing good-quality imperviousness under a pressure which may vary between a few hundreds of millibars and several tens of bars, and for temperatures ranging between ambient temperature and several hundreds of degrees.

Another object of the present invention is to make a obturator ring in which that part of the ring, which is in contact with the valve body, is applied strongly against the valve body to provide greater imperviousness.

An additional object of the present invention is to make a obturator ring mounted in a groove made on the edge of the flap so as to obtain minimum leakage.

Consequently, an object of the present invention is to provide a obturator ring allowing for imperviousness between the flap and the valve body of a butterfly valve for a wide range of pressures and temperatures, said obturator ring comprising a split ring-shaped seal, mounted in a groove made on the edge of the flap, said split ring-shaped seal working together with a first elastic means applying the seal against the valve body and a second elastic means applying the seal against the groove of the flap, the elastic means being made of a refractory material and having a high fatigue strength.

According to a preferred embodiment, the first elastic means consists of a corrugated strip positioned in the bottom of the groove and the second elastic means consists of a corrugated washer positioned between one of the walls of the groove and the ring-shaped seal. The use of these two elastic means provides good contact between the flap and the obturator ring and between the obturator ring and the valve body, so as to prevent any leakage of fluid between the flap and the valve body and inside the ring assembling groove.

Furthermore, the use of two elastic means provides for better adaptation to variations in pressure and temperature.

The refractory material of high fatigue strength, used to make the elastic means, may consist, for example, of a nickel-chromium based alloy, preferably a nickel-chromium alloy comprising 52% of nickel. An alloy of this type is marketed under the brand name INCOMEL 718 by TELEDYNE RODNEY METALS. This alloy can withstand temperatures of 600° C. and pressures of 24 bars.

According to a preferred embodiment, the split ring-shaped seal has a ring-shaped base extending outwards by a lip designed to be applied against the valve body, said seal having a substantially L-shaped section.

According to another feature of the present invention, to obtain greater imperviousness, the end of the lip of the ring-shaped seal has a toric shape. Similarly, the ring-shaped base and the lip are connected to each other by a rounded profile, thus preventing leakages between the flap and the obturator ring while providing good contact between these two elements.

Furthermore, to withstand variations in pressure and in temperature, the ring-shaped seal is made of a cobalt-based alloy. An alloy of this type is refractory and non-oxidizing, and has good friction characteristics.

BRIEF DESCRIPTION OF THE DRAWINGS

Other features and advantages of the present invention will emerge from the following description of an embodiment, made with reference to the appended drawings, of which.

SUMMARY OF THE INVENTION

Figure 1:
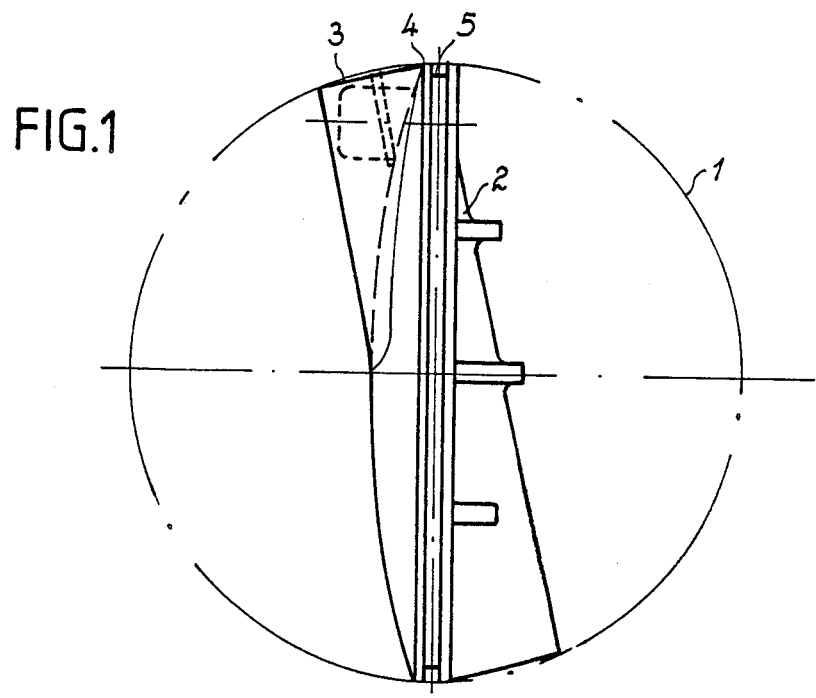
FIG. 1 is a schematic view of a butterfly valve in which the flap is in the open position.

As shown schematically in FIG. 1, a butterfly valve essentially consists of a valve body 1, demarcated internally by a cylinder with a circular section in which a flap or obturating device 2 is mounted.

Figure 2:
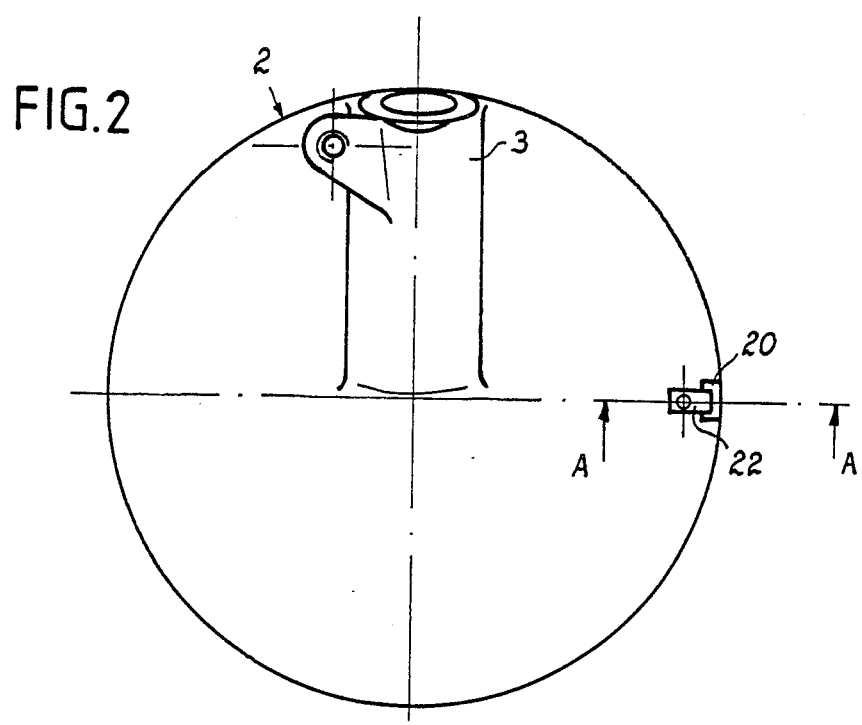
FIG. 2 is a plane top view of a butterfly valve which can be used in the present invention.

As shown in FIG. 2, the flap consists of a flat, circular disk in the embodiment shown. This flat disk is fixed to the valve body 1 by means of a pin mounted in a hollow shaft 3 made on the disk. Thus, closing or opening of the flap is obtained by the rotation of the disk on this pin. As shown in FIG. 1, the disk has a groove 5 at its periphery 4 to receive a obturator ring as shall be described hereafter.

Figure 3:
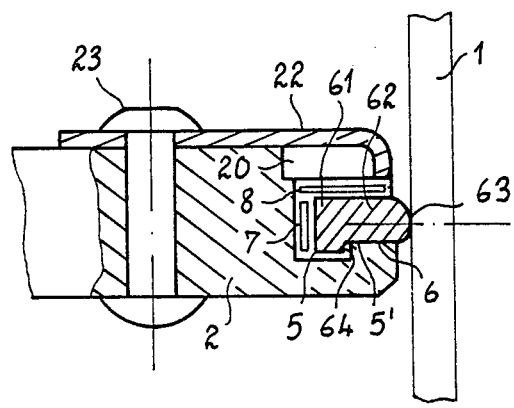
FIG. 3 is a sectional view, through A—A of FIG. 2, showing a obturator ring according to the present invention.

The obturator ring according to the present invention is shown in FIG. 3. This obturator ring consists of a split ring-shaped seal 6, working together with two elastic means, 7 and 8, applying the seal respectively against the valve body 1 and against one of the lateral faces 5' of the groove 5. The ring-shaped seal 6 preferably has a ring-shaped base 61 which extends outwards by means of a lip 62 designed to be applied against the valve body 1. Thuss, the seal has a substantially L-shaped section. This seal is inserted in the groove. The groove 5 has been machined so as to have a heel. This heel makes it possible to hold the obturator ring in position when the flap is in the open position. For better contact between the ring-shaped seal and the valve body, the end 63 of the lip 62 has a toric shape. This enables better adaptation to the different pressures exerted. Furthermore, to prevent any leakage of fluid inside the groove, especially between the heel 5' and the obturator ring, the ring-shaped base 6 and the lip 62 are attached to each other by a rounded profile 64.

Figure 4:
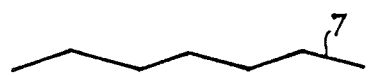
FIG. 4 is a schematic sectional view of a part of the elastic strip used with the obturator ring of FIG. 3.

According to the present invention, the elastic means 7 consists of a spring leaf which is, preferably, a corrugated strip as shown in FIG. 4. This corrugated strip is positioned in the bottom of the groove 5. The second elastic means 8 consists of a corrugated washer made of an elastic material. This washer, made of an elastic material, has a section similar to that of the corrugated strip. The washer 8 is positioned between one of the walls of the groove and the ring-shaped seal 6. To enable its assembly in the groove, the washer has been split. Furthermore, as shown in FIG. 3, the disk of the flap 2 has a hollow 20 on a small part of its circumference, and a strip 22 fixed by a pin 23, holds the washer 8 in position at the hollow 20. According to the invention, to provide proper imperviousness at a broad range of temperatures and pressures, the two elastic means are made of a refractory material with high fatigue strength. Thus, to obtain a valve enabling operation at temperatures varying between ambient temperature and 600° C. as well as pressures varying between 500 millibars and 24 bars, the corrugated strip and washer are made of a nickel-chromium based alloy, preferably an alloy containing 52% of nickel, such as the alloy marketed under the brand name INCONEL 718. This alloy retains sound characteristics under various temperatures. It is non-oxidizing and has high fatigue strength. Furthermore, the ring-shaped seal is preferably made of cobalt-based alloy such as the alloy marketed under the brand name ALACRITE 554 or 602 or under the brand name HAYNES 25. This type of alloy has many advantages. In particular, it is very refractory. It has good frictional characteristics and does not grip when two non-oxidizing materials are in contact.

The invention has been described with reference to a particular embodiment. It is clear to those skilled in the art that the invention may have a great many alternative embodiments, particularly as regards the fixing of the obturator ring inside the groove, the embodiment of the washer and of the elastic strips and the materials used.

What is claimed is:

1. An obturator ring providing imperviousness between a flap and a valve body of a butterfly valve for a wide range of pressures and temperatures, wherein said obturator ring comprises:

a split ring-shaped seal, mounted in a groove made on the edge of the flap, and which comprises a first refractory material, said split ring-shaped seal working together with first elastic means for radially biasing the seal against the valve body and second elastic means, separate from said first elastic means, for biasing the seal axially against the groove, wherein the first and second elastic means each also comprise a second refractory material having a relatively high fatigue strength.

2. An obturator ring according to claim 1, wherein the first elastic means comprises a corrugated strip positioned in the bottom of the groove.

3. An obturator ring according to claim 1, wherein the second elastic means comprises a corrugated washer positioned between one of the walls of the groove and the ring-shaped seal.

4. An obturator ring according to claim 1, wherein the second refractory material comprises a nickel-chromium based alloy.

5. An obturator ring according to claim 1, wherein the ring-shaped seal has a ring-shaped base which extends outwards through a lip designed to be applied against the body of the valve, said seal having a substantially L-shaped section.

6. An obturator ring according to claim 5, wherein the end of the lip has a toric shape.

7. An obturator ring according to claim 5, wherein the ring-shaped base and the lip are attached to each other by means of a rounded profile.

8. An obturator ring according to claim 1, wherein the ring-shaped seal comprises a cobalt-based alloy.

* * * * *